(12) United States Patent
Culkin et al.

(10) Patent No.: US 11,739,234 B2
(45) Date of Patent: Aug. 29, 2023

(54) NATURAL STONE SEALER COMPOSITIONS

(71) Applicant: Questech Corporation, Rutland, VT (US)

(72) Inventors: Barry Culkin, Braintree, MA (US); Roger Questel, Arlington, VT (US); Robert Harrington, Plymouth, MA (US); Douglas Croteau, North Springfield, VT (US); Paul Thottathil, New Hyde Park, NY (US); Purushoth Kesavan, Franklin Square, NY (US); John Ryan, Bellmore, NY (US); Satyabrata Mukherjee, Westbury, NY (US)

(73) Assignee: Questech Corporation, Rutland, VT (US)

( * ) Notice: Subject to any disclaimer, the term of this patent is extended or adjusted under 35 U.S.C. 154(b) by 283 days.

(21) Appl. No.: 17/248,664

(22) Filed: Feb. 2, 2021

(65) Prior Publication Data

US 2021/0253890 A1 Aug. 19, 2021

Related U.S. Application Data

(60) Provisional application No. 62/975,405, filed on Feb. 12, 2020.

(51) Int. Cl.

| | |
|---|---|
| *C09D 127/16* | (2006.01) |
| *C09D 5/02* | (2006.01) |
| *C09D 7/20* | (2018.01) |
| *C09D 175/14* | (2006.01) |
| *C09D 133/04* | (2006.01) |
| *C04B 41/63* | (2006.01) |
| *C04B 41/45* | (2006.01) |
| *C04B 41/48* | (2006.01) |
| *C04B 41/00* | (2006.01) |

(52) U.S. Cl.
CPC ......... *C09D 127/16* (2013.01); *C04B 41/009* (2013.01); *C04B 41/4539* (2013.01); *C04B 41/483* (2013.01); *C04B 41/4842* (2013.01); *C04B 41/4884* (2013.01); *C04B 41/63* (2013.01); *C09D 5/022* (2013.01); *C09D 7/20* (2018.01); *C09D 133/04* (2013.01); *C09D 175/14* (2013.01)

(58) Field of Classification Search
CPC ........ C09D 127/16; C09D 5/022; C09D 7/20; C09D 175/14; C09D 133/04; C04B 41/63; C04B 41/4539; C04B 41/4842; C04B 41/4884; C04B 41/483; C04B 41/009
USPC ........................................................ 524/501
See application file for complete search history.

(56) References Cited

U.S. PATENT DOCUMENTS

| | | |
|---|---|---|
| 5,207,873 A | 5/1993 | Sanduja et al. |
| 5,290,826 A | 3/1994 | Palmer |
| 5,407,728 A | 4/1995 | Kerr et al. |
| 6,085,797 A | 7/2000 | Grabaum et al. |
| 6,638,319 B2 | 10/2003 | Sanduja et al. |
| 6,783,865 B2 | 8/2004 | Sanduja et al. |
| 6,908,976 B2 | 6/2005 | Sanduja et al. |
| 6,943,218 B1 | 9/2005 | Sanduja et al. |
| 6,994,794 B2 | 2/2006 | Hansen et al. |
| 2004/0071912 A1 | 4/2004 | Berth |
| 2012/0183789 A1 | 7/2012 | Smith |
| 2014/0349106 A1 | 11/2014 | Chen et al. |
| 2017/0141719 A1 | 5/2017 | Horgnies et al. |
| 2019/0047916 A1* | 2/2019 | Culkin ................ C04B 41/4884 |

FOREIGN PATENT DOCUMENTS

| | | |
|---|---|---|
| WO | 2005049719 A2 | 6/2005 |
| WO | 2009114935 A1 | 9/2009 |

* cited by examiner

*Primary Examiner* — Hui H Chin
(74) *Attorney, Agent, or Firm* — Pierce Atwood LLP

(57) ABSTRACT

Disclosed is a two-part composition for sealing natural stone or masonry, and methods of use. The two-part composition is comprised of (1) a first part comprising a polyvinylidene fluoride (PVDF) particulate; a low evaporation rate organic solvent; and water; and (2) a second part comprising a blend of a plurality of liquid resin formulations.

24 Claims, No Drawings

NATURAL STONE SEALER COMPOSITIONS

BACKGROUND

Natural stone provides a decorative aspect to surfaces, such as walls within a household, building foyers and other public interior and exterior areas, including decorative monuments and building facades. Untreated natural stone in its raw, unsealed form may easily stain, etch, or otherwise visually deteriorate.

Various attempts have been made to inhibit such visible deterioration of natural stone. One technique involves using a sealer. Yet, most presently available sealers are penetrating sealers that leave the surface of the natural stone vulnerable to staining and etching quite readily after application.

SUMMARY OF THE INVENTION

Disclosed is two-part composition for sealing natural stone or masonry, comprising (1) a first part comprising: a polyvinylidene fluoride (PVDF) particulate; a low evaporation rate organic solvent; and water; and (2) a second part comprising a blend of a plurality of liquid resin formulations. In instances, the PVDF particulate comprises from 18.8 to 26.8% by weight of the first part; the low evaporation rate organic solvent comprises from 10.6 to 15.4% by weight of the first part; and water comprises from 58.9 to 69.8% by weight of the first part. In instances, the PVDF particulate comprises from 19.3 to 24.6% by weight of the first part; the low evaporation rate organic solvent comprises from 10.3 to 14.3% by weight of the first part; and water comprises from 59.8 to 64.0% by weight of the first part. In instances, each of the plurality of liquid resin formulations is miscible in water. In instances, the plurality of liquid resin blends are selected from the group consisting of a modified acrylic co-polymer, a urethane pre-polymer, a tetrafluoroethylene-polypropylene co-polymer, a polycarbonate urethane/acrylic hybrid pre-polymer and a self-crosslinking acrylic dispersion pre-polymer. In instances, the combined % by weight of the blend of the two or more liquid resins ranges from 44.4% by weight of the total weight of the first part and second part combined weight, to 51.6% by weight of the total weight of the first part and second part combined weight. In instance, the second part further comprises an effective amount of urea peroxide catalyst and silver perchlorate activator. In instances, the second part further comprises an effective amount of urea peroxide catalyst and ferrous ammonium sulfate activator. In instances, the two-part composition further comprises, as components of the first part or the second part, or both parts, effective amounts of a plurality of components selected from the group consisting of: a polymeric fluorochemical surfactant; an aqueous dispersion of PTFE; an ethoxylated (E015) trimethylolpropane triacrylate (water soluble liquid urethane acrylate monomer); a silane cross-linking solution; a film-coating emulsion; a fluoroalkylfunctional water-borne oligosiloxane; a waterborne anionically-stabilized colloidal dispersion of phenoxy resin PKHH. In instances, the two-part composition of claim 1 further comprises, as a component of the first part or the second part, or both parts, an effective amount of an antimicrobial agent.

Also disclosed is a method for making a two-part composition for sealing natural stone or masonry, the method comprising: (1) providing a first part comprising: a polyvinylidene fluoride (PVDF) particulate; a low evaporation rate organic solvent; and water; (2) providing a second part comprising a blend of a plurality of liquid resins; and (3) mixing the first and second part to provide a composition for sealing natural stone or masonry in a 1:3 ratio. In instances, the PVDF particulate comprises from 18.8 to 26.8% by weight of the first part; the low evaporation rate organic solvent comprises from 10.6 to 15.4% by weight of the first part; and water comprises from 58.9 to 69.8% by weight of the first part. In instances, the PVDF particulate comprises from 19.3 to 24.6% by weight of the first part; the low evaporation rate organic solvent comprises from 10.3 to 14.3% by weight of the first part; and water comprises from 59.8 to 64.0% by weight of the first part. In instances, each of the plurality of liquid resin formulations is miscible in water. In instances, the plurality of liquid resin blends are selected from the group consisting of a modified acrylic co-polymer, a urethane pre-polymer, a tetrafluoroethylene-polypropylene co-polymer, a polycarbonate urethane/acrylic hybrid pre-polymer and a self-crosslinking acrylic dispersion pre-polymer. In instances, the combined % by weight of the blend of the two or more liquid resins ranges from 44.4% by weight of the total weight of the first part and second part combined weight, to 51.6% by weight of the total weight of the first part and second part combined weight. In instance, the second part further comprises an effective amount of urea peroxide catalyst and silver perchlorate activator. In instances, the second part further comprises an effective amount of urea peroxide catalyst and ferrous ammonium sulfate activator. In instances, the two-part composition further comprises, as components of the first part or the second part, or both parts, effective amounts of a plurality of components selected from the group consisting of: a polymeric fluorochemical surfactant; an aqueous dispersion of PTFE; an ethoxylated (E015) trimethylolpropane triacrylate (water soluble liquid urethane acrylate monomer); a silane cross-linking solution; a film-coating emulsion; a fluoroalkylfunctional water-borne oligosiloxane; a waterborne anionically-stabilized colloidal dispersion of phenoxy resin PKHH. In instances, the two-part composition of claim 1 further comprises, as a component of the first part or the second part, or both parts, an effective amount of an antimicrobial agent.

DETAILED DESCRIPTION

Disclosed is a two-part composition for sealing natural stone or masonry. The two-part composition is comprised of (1) a first part comprising which comprises: (a) a polyvinylidene fluoride (PVDF) particulate; (b) a low evaporation rate organic solvent; and (c) water; and (2) a second part comprising a blend of a plurality of liquid resin formulations.

The first part can be described as a flowable, low-viscosity PVDF suspension. To produce the desired flowable suspension, PVDF polymers of defined particle size range are preferred. Particle size can be determined through the use of a Microtrac particle size analyzer. The preferred particle size range is from 20 to 200 microns. While some outlier particles, with respect to size, can be tolerated, it is preferred that at least 60%-70% by dry weight of the PVDF particulate fall within the preferred particle size range of 20 to 200 microns. A fine powder form of PVDF (e.g., less than 10 microns) presents certain handling difficulties and formulation challenges. Courser particulate (e.g., greater than 200 microns) form thick pastes and tend to settle out of suspension more quickly, which is not preferred. The preferred 20-200 micron range is preferred for the preparation of high solids content free flowing suspensions.

PVDF particulate of the preferred size range can be produced by grinding PVDF polymer pellets followed by classification into the preferred size range. One skilled in the art will recognize that either a disk attrition moll or a hammer mill can be used to provide the discussed size reduction, with standard screening being employed for size range classification. A suitable commercially available PVDF product is marketed by Arkema as Kynar Flex® 2821-00 Polyvinylidene Fluoride Powder.

A low evaporation rate organic solvent with compatible chemical functionality has been identified as DB Solvent (diethylene glycol monobutyl ether—stabilized). DB Solvent is a commodity available, for example, from Eastman™ Chemical. Through the use of a solvent selector chart, one of skill in the art can readily identify alternative low evaporation rate organic solvents which can be tested as a DB Solvent substitute using no more than routine experimentation.

It has been determined experimentally that although PVDF particulate settling in the first part of the disclosed two-part compositions, does take place, it is easily reversible for re-suspension through simple stirring. If, however, a mixture comprising the first part of the two-part composition and the second part of the two part composition is allowed to stand, the particulate settling forms a "hard-pack" that is difficult to re-suspend, requiring the user to first mechanically drag/pry the fallout off of the bottom surface of the container, and then stir aggressively until the liquid becomes homogeneous once again. It will be recognized, therefore, that the two-part composition of the present disclosure should be finally formulated (i.e., first part and second part combined) near in time to application to minimize settling, and then re-stirred or agitated, frequently or continuously, to maintain homogeneity of the formula. Continual, gentle agitation is recommended for applications lasting more than several minutes.

Disclosed are instances of the two-part composition wherein the PVDF powder comprises from 18.8 to 26.8% by weight of the first part; the low evaporation rate organic solvent comprises from 10.6 to 15.4% by weight of the first part; and water comprises from 58.9 to 69.8% by weight of the first part. These percentages by weight range from 5% below to 5% above the specifically reported values in the Exemplification section and one skilled in the art would recognize that broadened range is within tolerances. Also disclosed are instances of the two-part composition wherein the PVDF powder comprises from 19.3 to 24.6% by weight of the first part; the low evaporation rate organic solvent comprises from 10.3 to 14.3% by weight of the first part; and water comprises from 59.8 to 64.0% by weight of the first part.

With respect to the second part of the two-part composition, disclosed is a plurality of liquid resin formulations. Disclosed are instances in which the resins are synthetic resins. Typically such resins comprise a viscous liquid containing monomer and/or short-chain polymer units that polymerize into rigid, long-chain polymers through a curing process. In disclosed instances, the plurality of liquid resin formulations are selected from the group consisting of: a modified acrylic co-polymer; a tetrafluoroethylene-propylene co-polymer; a urethane pre-polymer; a polycarbonate urethane/acrylic hybrid pre-polymer; and a self-crosslinking acrylic dispersion pre-polymer. Later in this disclosure a table is provided which names commercially-available products falling within these generic descriptions. One of skill in the art can readily identify substitutes using no more than routine experimentation. Disclosed are instances wherein each of the plurality of liquid resins are water miscible.

Disclosed are instances of the two-part composition wherein the combined percent by weight of the blend of the two or more liquid resins ranges from 44.4% by weight of the total weight of the first part and second part combined weight, to 51.6% by weight of the total weight of the first part and second part combined weight.

Activator and catalyst components are preferably included in the second part of the two-part composition. While not wishing to be bound by theory, it is believed that the formulations disclosed chemically graft to the surface of natural stone or masonry following application. In instances, disclosed activators are selected from the group consisting of silver perchlorate, in effective amounts and ferrous ammonium sulfate, in effective amounts. These activators/free-radical generators are effective at very low inclusion levels in the 0.01% by weight range. The useful range can be bracketed through the use of no more than routine experimentation. In instances, a disclosed catalyst is urea peroxide, in an effective amount. This catalyst is effective at very low inclusion levels in the 0.1% by weight range. Again, the useful range can be bracketed through the use of no more than routine experimentation. It is believed that the activator component reacts with stone surface to break chemical bonds on the stone surface that open sites that allow liquid resin components to chemically combine while forming polymerization chains. Catalysts provide free-oxygen and reaction heat which initiates polymerization of the pre-polymer components.

Described above are required elements of the first part of the two-part composition, and required elements of the second part of the two-part composition. As indicated, it is important to keep the first part components separate from the second part components, until close to the time of application of the two-part composition to natural stone or masonry to avoid the "hard packing" problem described above. This hard packing problem is related to the settling of PVDF particulate from the liquid suspension in the presence of liquid resin.

Disclosed instances include additional components of the two-part composition. Because the additional components do not contribute to the "hard packing" problem, they can be included in the first part of the two-part composition. Additionally, because they have no negative impact on the liquid resin formulations, they can be included in the second part of the two part composition. Considerations relating to whether these additional components should be added to the first part, or the second part, or both, are largely related to final volumes of the first and second parts. In preferred instances the final volume ratios of the first part to the second part are 1 (first part): 3 (second part). At scale, these volumes may be shipped in 55 gallon drums or 275 gallon totes. Of course, for smaller applications the volume is scaled back and shipped in appropriate containers.

In disclosed instances, these additional components include effective amounts of a plurality of components selected from the group consisting of: a non-ionic polymeric fluorochemical surfactant; an aqueous dispersion of PTFE; an ethoxylated (15EO) trimethylolpropane triacrylate (water soluble liquid urethane acrylate monomer); a silane cross-linking solution; a film-coating emulsion; a fluoroalkylfunctional water-borne oligosiloxane; a waterborne anionically-stabilized colloidal dispersion of phenoxy resin PKHH. Instances disclosed also include an antimicrobial agent in an effective amount. The Exemplification section discloses effective amounts of these additional components and one of skill in the art could bracket effective ranges using no more than routine experimentation.

separated from the remaining liquid resins, in order to prevent hard-pack settling from occurring. The 2-parts of each example formulation are to be re-mixed in a 1:3 ratio

TABLE 1

| Component or Component Tradename | Supplier | Generic Description (including alternative expressions) |
| --- | --- | --- |
| Kynar Flex ® 2821-00 | Arkema Inc. | Polyvinylidene fluoride (PVDF) particulate |
| Eastman ™ DB Solvent | Eastman Chemical Company | Diethylene glycol monobutyl ether - stabilized |
| Joncryl ® 538A | BASF Corporation | Liquid resin; modified acrylic co-polymer; acrylic pre-polymer emulsion |
| Alberdingk ® AC 25381 | Alberdingk Boley GmbH | Liquid resin; acrylic pre-polymer; self-crosslinking acrylic dispersion pre-polymer |
| NeoRez ® R-9603 | DSM Coating Resins, Inc. | Liquid resin; urethane pre-polymer |
| NeoPac R-9036 | DSM Coating Resins, Inc. | Liquid resin; polycarbonate urethane/acrylic hybrid pre-polymer; |
| AFLAS ® 300S TFE/P Latex | AGC, Inc. | Liquid resin, tetrafluoroethylene-polypropylene co-polymer |
| FC 4430 (2% solution of commercial product) | 3M ™ Advance Material Division | Polymeric fluorochemical surfactant diluted in water |
| AquaFLON ® 50 (previously Fluoro AQ 50) | Shamrock Technologies | Aqueous dispersion of PTFE |
| SR-9035 | Arkema Inc. | Ethoxylated (EO15) trimethylolpropane triacrylate (water soluble liquid urethane acrylate monomer) |
| CoatOSil ™ 1770 Silane | Momentive Performance Materials Inc. | Silane cross-linking solution (see U.S. Pat. No. 5,714,532) |
| Ultra-Fresh ™ DM-25 | Thomson Research Associates, Ind. | Antimicrobial solution |
| API-296E | Advanced Polymer, Inc | Film-forming emulsion |
| Dynasylan ® F8815 | Evonik Corporation USA | Fluoroalkylfunctional water-borne oligosiloxane |
| PKHW 34 | Gabriel Chemical | Waterborne anionically-stabilized colloidal dispersion of phenoxy resin PKHH |
| Urea peroxide (0.1% solution) | Generic | Catalyst |
| Silver perchlorate (0.01% solution) | Generic | Activator, free-radical generator |
| Ferrous ammonium sulfate (0.01% solution) | Generic | Activator, free-radical generator |

The mixing of the first part and second part of the two-part composition is carried out just prior to application to avoid "hard pack" formation as previously discussed. The two-part composition may be applied to natural stone by spraying, manual application with pads, rollers, brushes, etc., or any other convenient technique. The coated natural stone may then be air dried for about seventy-two (72) hours.

To accelerate the curing of the sealer (i.e., to cure/cross-link/provide protection to the natural stone more quickly), the coated natural stone may be subjected to curing at about 100 degrees C. to about 110 degrees C. for about ten (10) minutes to about fifteen (15) minutes after air drying for about ten (10) minutes to about fifteen (15) minutes, followed by additional air-drying for about 24 hours.

EXEMPLIFICATION

A two-part compositions was be prepared by mixing, in two separate containers with a final use ratio of 1 (first part): 3 (second part), the components identified in the Tables 2-5 below, until a pair of homogeneous mixtures were achieved. The purpose of preparing these formulations as 2-part systems is to improve shelf-life homogeneity and for ease of re-suspension of the particulate fluoropolymer, when kept at the time of use. Prior to using the first part, it should be mixed to re-suspend the particulate at the bottom. After combining parts, the resulting formulation should be continuously gently agitated in order to maintain homogeneity during application, as well as to prevent clumping from occurring. Fine filtration (200-mesh) is also recommended during use in order to prevent clogging of spray equipment and to yield the most consistent finish regardless of application method.

Example Composition 1

The following was mixed as a 2-part formulation into two homogenous mixtures to later be combined in a 1 (first part) to 3 (second part) ratio for application:

TABLE 2

| Components | Parts by Weight |
| --- | --- |
| First Part | |
| Kynar Flex ® 2821-00 PVFD particulate | 29.00 |
| Eastman ™ DB Solvent | 14.34 |

TABLE 2-continued

| Components | Parts by Weight |
| --- | --- |
| FC 4430 (2% solution) | 4.00 |
| Water | 70.5 |
| TOTAL FIRST PART-> | 117.84 |
| Second Part | |
| Water | 27.00 |
| Joncryl ® 538A | 60.00 |
| NeoPac R-9036 | 75.00 |
| Water | 27.00 |
| Alberdingk ® AC 25381 | 77.50 |
| Water | 11.00 |
| AquaFLON ® 50 (formerly Fluoro AQ 50) | 8.00 |
| Eastman ™ DB Solvent | 43.00 |
| Water | 21.50 |
| SR 9035 | 0.50 |
| CoatOSil ™ 1770 Silane | 1.00 |
| Urea peroxide (0.1% solution) | 1.00 |
| Silver perchlorate (0.01% solution) | 0.50 |
| TOTAL SECOND PART-> | 353.0 |

To make up the first part, the 29.00 parts by weight of PVDF particulate was pre-mixed with 14.34 parts by weight of diethylene glycol monobutyl ether (stabilized) and 70.5 parts by weight of water and 4.00 parts by weight of the polymeric fluorochemical surfactant (prepared as a 2% solution through dilution of the 3M™ Advanced Material Division product in water). To make up the second part, prior to being mixed with the remainder of the components; the 60.00 parts by weight acrylic pre-polymer emulsion was pre-mixed with the 75.00 parts by weight of the polycarbonate urethane/acrylic hybrid pre-polymer and 27.00 parts by weight of water. Prior to being mixed with the remainder of the components, the 77.50 parts by weight of self-crosslinking acrylic dispersion pre-polymer was premixed with the 27.00 parts by weight of water. Prior to being mixed with the remainder of the components, the 8.00 parts by weight of aqueous dispersion of PTFE was premixed with the 11.00 parts by weight of water. Prior to being mixed with the remainder of the components the 43.00 parts by weight of diethylene glycol monobutyl ether (stabilized) was pre-mixed with the 21.50 parts by weight of water, the 0.50 parts by weight of ethoxylated (E015) trimethylolpropane triacrylate (water soluble liquid urethane acrylate monomer) and silver perchlorate solution and the 1.00 parts by weight of the silane cross-linking solution and the urea peroxide solution. With both the first part and the second part prepared, for use at the time of application, the first part was gently re-mixed to re-suspend the PVDF particulate component to form a liquid suspension, and a desired amount was weighed into a larger vessel (one-quarter of total desired amount to be used). Three times the first part weight was then weighed of the second part, and this was stirred into the larger vessel containing the previously transferred first part. This combined formula was then gently agitated continuously while the application was taking place to maintain homogeneity of the formula application.

Example Composition 2

The following was mixed as a 2-part formulation into two homogenous mixtures to later be combined in a 1 (first part): 3 (second part) ratio for application.

TABLE 3

| Components | Parts by Weight |
| --- | --- |
| First Part | |
| Kynar Flex ® 2821-00 PVFD particulate | 24.3 |
| Eastman ™ DB Solvent | 12.2 |
| UltraFresh ™ DM-25 | 0.9 |
| API-296E | 8.1 |
| Water | 72.3 |
| TOTAL FIRST PART-> | 117.8 |
| Second Part | |
| Water | 20.0 |
| AFLAS ® 300S TFE/P Latex | 81.1 |
| NeoPac R-9036 | 97.3 |
| Water | 15.0 |
| Alberdingk ® AC 25381 | 64.9 |
| Water | 8.0 |
| AquaFLON ® 50 (formerly Fluoro AQ 50) | 24.3 |
| Water | 6.3 |
| Eastman ™ DB Solvent | 36.4 |
| Dynasylan ® F8815 | 0.05 |
| CoatOSil ™ 1770 Silane | 0.05 |
| SR 9035 | 0.14 |
| PKHW 34 | 0.05 |
| Urea peroxide (0.1% solution) | 0.28 |
| Ferrous ammonium sulfate (0.01% solution) | 0.05 |
| TOTAL SECOND PART> | 353.9 |

To make up the first part, the 24.3 parts by weight of PVDF particulate was pre-mixed with the 12.2 parts by weight of diethylene glycol monobutyl ether (stabilized), and the 72.3 parts by weight of water, plus the 0.9 parts by weight of antimicrobial solution and the 8.1 parts by weight of film-forming emulsion.

To make up the second part, prior to being mixed with the remainder of the components; the 81.1 parts by weight tetrafluoroethylene-polypropylene co-polymer was pre-mixed with the 97.3 parts by weight of polycarbonate urethane/acrylic hybrid pre-polymer and 20.00 parts by weight of water. Prior to being mixed with the remainder of the components; the 64.9 parts by weight of self-crosslinking acrylic dispersion pre-polymer was premixed with the 15.00 parts by weight of water. Prior to being mixed with the remainder of the components; the 24.3 parts by weight of aqueous dispersion of PTFE was premixed with the 8.00 parts by weight of water. Prior to being mixed with the remainder of the components the 36.4 parts by weight of diethylene glycol monobutyl ether (stabilized), was pre-mixed with the 6.3 parts by weight of water, the 0.05 parts by weight of fluoroalkylfunctional water-borne oligosiloxane, the 0.05 parts by weight of the silane cross-linking solution and 0.05 parts by weight of waterborne anionically-stabilized colloidal dispersion of phenoxy resin PKHH, the 0.14 parts by weight of ethoxylated (E015) trimethylolpropane triacrylate (water soluble liquid urethane acrylate monomer) and the 0.05 parts by weight of ferrous ammonium sulfate solution and the 0.28 parts by weight urea peroxide solution. All of the components of the paragraph were then combined to form the second part solution.

With the first part and the second part prepared, for use at the time of application, the first part was gently re-mixed to re-suspend the PVDF particulate component to for a homogeneous liquid suspension, and a desired amount was weighed into a larger vessel (one-quarter of total desired amount to be used). Three times the first part weight was then weighed of the second part, and this was stirred into the larger vessel containing the previously transferred first part.

This combined formula was then gently agitated continuously while the application was taking place to maintain homogeneity of the formula application.

Example Composition 3

The following was mixed as a 2-part formulation into two homogenous mixtures to later be combined in a 1 (first part): 3 (second part) ratio for application.

TABLE 4

| Components | Parts by Weight |
| --- | --- |
| FIRST PART: | |
| Kynar Flex ® 2821-00 PVFD particulate | 22.6 |
| Eastman ™ DB Solvent | 16.8 |
| UltraFresh ™ DM-25 | 0.9 |
| Water | 75 |
| FC 4430 (2% solution) | 1.9 |
| TOTAL FIRST PART-> | 117.2 |
| SECOND PART: | |
| Water | 23.6 |
| Joncryl ® 538A | 52.8 |
| NeoPac R-9036 | 52.8 |
| NeoRez ® R-9603 | 37.8 |
| Water | 15.0 |
| Alberdingk ® AC 25381 | 90.6 |
| Water | 20.0 |
| AquaFLON ® 50 (formerly Fluoro AQ 50) | 7.06 |
| Water | 25.0 |
| Eastman ™ DB Solvent | 28.5 |
| CoatOSil ™ 1770 Silane | 0.47 |
| SR 9035 | 0.24 |
| Urea peroxide (0.1% solution) | 0.47 |
| Silver perchlorate (0.01% solution) | 0.24 |
| TOTAL SECOND PART-> | 354.58 |

To make up the first part, the 22.6 parts by weight of PVDF particulate was premixed with the 16.8 parts by weight of diethylene glycol monobutyl ether (stabilized), the 75 parts by weight of water, the 0.9 parts by weight of antimicrobial solution and the 1.9 parts by weight of polymeric fluorochemical surfactant solution (diluted in water) prior to being mixed with the remainder of the components.

To make up the second part, the 52.8 parts by weight of acrylic pre-polymer emulsion was premixed with the 52.8 parts by weight of polycarbonate urethane/acrylic hybrid pre-polymer and 37.8 parts by weight of urethane pre-polymer and the 23.6 parts by weight of water prior to being mixed with the remainder of the components. The 90.6 parts by weight of self-crosslinking acrylic dispersion pre-polymer was premixed with the 15.00 parts by weight of water prior to be mixed with the remainder of the components. Prior to being mixed with the remainder of the components; the 7.06 parts by weight of the aqueous dispersion of PTFE was premixed with the 20.00 parts by weight of water. Prior to being mixed with the remainder of the components the 28.5 parts by weight of diethylene glycol monobutyl ether (stabilized) was premixed with the 25.0 parts by weight of water, the 0.47 parts by weight of the silane cross-linking solution, the 0.24 parts by weight of ethoxylated (E015) trimethylolpropane triacrylate (water soluble liquid urethane acrylate monomer) and the 0.24 parts by weight of silver perchlorate solution and the 0.47 parts by weight urea peroxide solution. All of the components described in this paragraph were then combined to form the second part solution.

With both the first part and the second part prepared, for use at the time of application, the first part was gently re-mixed to re-suspend the PVDF particulate until homogeneous liquid suspension was formed, and a desired amount was weighed into a larger vessel (one-quarter of total desired amount to be used). Three times the first part weight was then weighed of the second part, and this was stirred into the larger vessel containing the previously transferred first part. This combined formula was then gently agitated continuously while the application was taking place to maintain homogeneity of the formula application.

Example Composition 4

The following was mixed as a 2-part formulation into two homogenous mixtures to later be combined in a 1 (first part): 3 (second part) ratio for application.

TABLE 5

| Components | Parts by Weight |
| --- | --- |
| First Part: | |
| Kynar Flex ® 2821-00 PVFD particulate | 25.8 |
| Eastman ™ DB Solvent | 16.0 |
| Water | 72.00 |
| UltraFresh ™ DM-25 | 0.94 |
| FC 4430 (2% solution) | 2.59 |
| TOTAL FIRST PART-> | 117.3 |
| Second Part: | |
| Water | 30.6 |
| Joncryl ® 538A | 41.9 |
| NeoPac R-9036 | 41.9 |
| NeoRez ® R-9603 | 41.7 |
| Water | 30.0 |
| Alberdingk ® AC 25381 | 83.8 |
| Water | 35.00 |
| Eastman ™ DB Solvent | 47.0 |
| Dynasylan ® F8815 | 0.14 |
| SR 9035 | 0.66 |
| Urea peroxide (0.1% solution) | 0.66 |
| Silver perchlorate (0.01% solution) | 0.66 |
| TOTAL SECOND PART-> | 354.2 |

To make up the first part, the 25.8 parts by weight of PVDF particulate was premixed with the 16.0 parts by weight of diethylene glycol monobutyl ether (stabilized), the 72.0 parts by weight of water, the 0.94 parts by weight of antimicrobial solution and the 2.59 parts by weight of polymeric fluorochemical surfactant (prepared as a 2% solution through dilution of the 3M™ Advanced Material Division product) prior to being mixed with the remainder of the components.

To make up the second part, the 41.9 parts by weight of acrylic pre-polymer emulsion was premixed with the 41.9 parts by weight of polycarbonate urethane/acrylic hybrid pre-polymer and 41.7 parts by weight of urethane pre-polymer and the 30.6 parts by weight of water prior to being mixed with the remainder of the components. The 83.8 parts by weight of self-crosslinking acrylic dispersion pre-polymer was premixed with the 30.00 parts by weight of water prior to be mixed with the remainder of the components. The 47.0 parts by weight of diethylene glycol monobutyl ether (stabilized) was premixed with the 35.0 parts by weight of water, the 0.14 parts by weight of the fluoroalkylfunctional water-borne oligosiloxane, the 0.66 parts by weight of ethoxylated (E015) trimethylolpropane triacrylate (water soluble liquid urethane acrylate monomer) and the 0.66 parts by weight of silver perchlorate solution and the 0.66 parts by weight urea peroxide solution prior to being mixed with the remainder of the components. All of the components described in this paragraph were then combined to form the second part solution.

With both the first part and the second part prepared, for use at the time of application, the first part was gently re-mixed to re-suspend the PVDF particulate until homogeneous liquid suspension was formed, and a desired amount was weighed into a larger vessel (one-quarter of total desired amount to be used). Three times the first part weight was then weighed of the second part, and this was stirred into the larger vessel containing the previously transferred first part. This combined formula was then gently agitated continuously while the application was taking place to maintain homogeneity of the formula application.

Application of Composition to Natural Stone

Compositions envisioned by the present disclosure were applied to natural stone by spraying, manual application with pads, rollers, brushes, etc., or any other convenient technique. The coated natural stone was then air dried for about seventy-two (72) hours.

To accelerate the curing of the sealer (i.e., to cure/cross-link/provide protection to the natural stone more quickly), the coated natural stone may be subjected to curing at about 100° C. to about 110° C. for about ten (10) minutes to about fifteen (15) minutes after air drying for about ten (10) minutes to about fifteen (15) minutes, followed by additional air-drying for about 24 hours. The accelerated curing method was not employed in connection with the application described in the Exemplification section herein.

Testing Performed to Confirm the Properties of the Compositions as Applied to Natural Stone Wet Dynamic Coefficient of Friction (DCOF) Test ANSI A137.1-2012 Section 9.6.1 testing was performed to measure the DCOF (i.e., slip-resistance) of ceramic tiles under the wet condition using a BOT 3000 device. Three (3) tiles without any composition according to the present disclosure being applied thereto, three (3) tiles having Composition 1 applied thereto, three (3) tiles having Composition 2 applied thereto, and three (3) tiles having Composition 3 applied thereto were tested. A minimum wet DCOF value of 0.42 is preferred for such testing.

The raw tiles and the tiles having the compositions applied thereto were cleaned with Renovator #120. Thereafter, the tiles were tested in all four directions with 6 inch long measurements. Testing was performed under wet conditions using 0.05% SLS water. Testing was conducted under laboratory conditions at approximately 70° F. and 50% relative humidity using a calibrated BOT 3000E device.

The following represents the individual and average DCOF data for each tile tested.

TABLE 6

Tiles Without Compositions Applied

| Direction | Tile 1 | Tile 2 | Tile 3 |
| --- | --- | --- | --- |
| Direction 1 | 0.49 | 0.51 | 0.49 |
| Direction 2 | 0.49 | 0.52 | 0.48 |
| Direction 3 | 0.48 | 0.48 | 0.48 |
| Direction 4 | 0.47 | 0.51 | 0.48 |
| Average | 0.48 | 0.51 | 0.48 |

TABLE 7

Tiles With Composition 1 Applied

| Direction | Tile 1 | Tile 2 | Tile 3 |
| --- | --- | --- | --- |
| Direction 1 | 0.44 | 0.41 | 0.41 |
| Direction 2 | 0.44 | 0.39 | 0.39 |
| Direction 3 | 0.43 | 0.41 | 0.39 |
| Direction 4 | 0.41 | 0.42 | 0.39 |
| Average | 0.43 | 0.41 | 0.40 |

TABLE 8

Tiles With Composition 2 Applied

| Direction | Tile 1 | Tile 2 | Tile 3 |
| --- | --- | --- | --- |
| Direction 1 | 0.38 | 0.35 | 0.40 |
| Direction 2 | 0.37 | 0.36 | 0.39 |
| Direction 3 | 0.36 | 0.37 | 0.37 |
| Direction 4 | 0.38 | 0.34 | 0.37 |
| Average | 0.37 | 0.36 | 0.38 |

TABLE 9

Tiles With Composition 3 Applied

| Direction | Tile 1 | Tile 2 | Tile 3 |
| --- | --- | --- | --- |
| Direction 1 | 0.51 | 0.48 | 0.48 |
| Direction 2 | 0.51 | 0.48 | 0.48 |
| Direction 3 | 0.49 | 0.48 | 0.47 |
| Direction 4 | 0.50 | 0.48 | 0.48 |
| Average | 0.50 | 0.48 | 0.48 |

Visible Abrasion Resistance of Glazed Ceramic Tile Test

ASTM C1027-09 testing was performed to measure the resistance of tile surfaces to visible surface abrasion. One 4 inch by 4 inch tile was tested for each composition.

A Gabbrielli Abrasimeter W1 was used to abrade the tiles. 10% hydrochloric acid was used to remove any metal oxide staining. The following represents the findings of the tests.

TABLE 10

| Composition Applied to the Tile | Results |
| --- | --- |
| Composition 1 | Visual difference in gloss or color after 750 revolutions = Class 3-suitable for heavy residential or light commercial use |
| Composition 2 | Visual different in gloss or color after 12,000 revolutions = Class 5-suitable for heavy commercial use |
| Composition 3 | Visual difference in gloss or color after 1,500 revolutions = Class 3-suitable for heavy residential or light commercial use |

Stain Test

CTIOA T-72 testing was performed to determine the stain and etch resistance effectiveness of the herein disclosed compositions when used on porous tile or stone samples. Three (3) samples were tested per staining agent per composition.

The samples were left in contact with the staining agents for 4 hours and then cleaned, dried, and evaluated for staining. The following represents the findings of the tests.

TABLE 11

| Staining Agent | Untreated Natural Stone | Composition 1 | Composition 2 | Composition 3 |
|---|---|---|---|---|
| Hot coffee (black) | Medium stain | No stain | Light stain | No stain |
| Red wine | Medium stain, light etching | No stain | Light stain | No stain |
| Mustard | Light stain, light etching | No stain | No stain | No stain |
| Ketchup | Light stain, light etching | No stain | No stain | No stain |
| Wesson Oil | Heavy statin | No stain | No stain | No stain |
| Soy Oil | Heavy stain | No stain | No stain | No stain |
| Formula 409 | No visible effect | No stain | No stain | No stain |

While the present invention has been particularly described in conjunction with specific embodiments, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

The invention claimed is:

1. A two-part composition for sealing natural stone or masonry, comprising:
   a. a first part comprising:
      i. a polyvinylidene fluoride (PVDF) particulate;
      ii. a low evaporation rate organic solvent; and
      iii. water; and
   b. a second part comprising a blend of a plurality of liquid resins.

2. The two-part composition of claim 1 wherein the PVDF particulate comprises from 18.8 to 26.8% by weight of the first part; the low evaporation rate organic solvent comprises from 10.6 to 15.4% by weight of the first part; and water comprises from 58.9 to 69.8% by weight of the first part.

3. The two-part composition of claim 1 wherein the PVDF particulate comprises from 19.3 to 24.6% by weight of the first part; the low evaporation rate organic solvent comprises from 10.3 to 14.3% by weight of the first part; and water comprises from 59.8 to 64.0% by weight of the first part.

4. The two-part composition of claim 1 wherein each of the plurality of liquid resins is miscible in water.

5. The two-part composition of claim 1 wherein the plurality of liquid resins are selected from the group consisting of a modified acrylic co-polymer, a urethane pre-polymer, a tetrafluoroethylene-polypropylene co-polymer, a polycarbonate urethane/acrylic hybrid pre-polymer and a self-crosslinking acrylic dispersion pre-polymer.

6. The two-part composition of claim 1 wherein the combined % by weight of the blend of the plurality of liquid resins ranges from 44.4% by weight of the total weight of the first part and second part combined weight, to 51.6% by weight of the total weight of the first part and second part combined weight.

7. The two-part composition of claim 1 wherein the second part further comprises urea peroxide catalyst and silver perchlorate activator.

8. The two-part composition of claim 1 wherein the second part further comprises urea peroxide catalyst and ferrous ammonium sulfate activator.

9. The two-part composition of claim 1 further comprising, as components of the first part or the second part, or both parts, a plurality of components selected from the group consisting of: a polymeric fluorochemical surfactant; an aqueous dispersion of PTFE; an ethoxylated (E015) trimethylolpropane triacrylate; a silane cross-linking solution; a film-coating emulsion; a fluoroalkylfunctional water-borne oligosiloxane; and a waterborne anionically-stabilized colloidal dispersion of phenoxy resin.

10. The two-part composition of claim 1 further comprising, as a component of the first part or the second part, or both parts, an antimicrobial agent.

11. A method for making a two-part composition for sealing natural stone or masonry, the method comprising:
   a. providing a first part comprising:
      i. a polyvinylidene fluoride (PVDF) particulate;
      ii. a low evaporation rate organic solvent; and
      iii. water;
   b. providing a second part comprising a blend of a plurality of liquid resins; and
   c. mixing the first and second parts to provide a composition for sealing natural stone or masonry in a 1:3 weight ratio.

12. The method of claim 11 wherein the PVDF particulate comprises from 18.8 to 26.8% by weight of the first part; the low evaporation rate organic solvent comprises from 10.6 to 15.4% by weight of the first part; and water comprises from 58.9 to 69.8% by weight of the first part.

13. The method of claim 11 wherein the PVDF particulate comprises from 19.3 to 24.6% by weight of the first part; the low evaporation rate organic solvent comprises from 10.3 to 14.3% by weight of the first part; and water comprises from 59.8 to 64.0% by weight of the first part.

14. The method of claim 11 wherein each of the plurality of liquid resins is miscible in water.

15. The method of claim 11 wherein the plurality of liquid resins are selected from the group consisting of a modified acrylic co-polymer, a urethane pre-polymer, a tetrafluoroethylene-polypropylene co-polymer, a polycarbonate urethane/acrylic hybrid pre-polymer and a self-crosslinking acrylic dispersion pre-polymer.

16. The method of claim 11 wherein the combined % by weight of the blend of the plurality of liquid resins ranges from 44.4% by weight of the total weight of the first part and second part combined weight, to 51.6% by weight of the total weight of the first part and second part combined weight.

17. The method of claim 16 wherein the second part further comprises urea peroxide catalyst and silver perchlorate activator.

18. The method of claim 17 wherein the second part further comprises urea peroxide catalyst and ferrous ammonium sulfate activator.

19. The method of claim 11 wherein the two-part composition further comprises, as components of the first part or the second part, or both parts, a plurality of components selected from the group consisting of: a polymeric fluorochemical surfactant; an aqueous dispersion of PTFE; an ethoxylated (E015) trimethylolpropane triacrylate; a silane cross-linking solution; a film-coating emulsion; a fluoroalkylfunctional water-borne oligosiloxane; and a waterborne anionically-stabilized colloidal dispersion of phenoxy resin.

20. The method of claim 19 further comprising, as a component of the first part or the second part, or both parts, an antimicrobial agent.

21. The two-part composition of claim 7 wherein:
   the urea peroxide catalyst is present in the amount of 1.00 parts by weight of the second part, 0.47 parts by weight of the second part, or 0.66 parts by weight of the second part; and the silver perchlorate activator is present in the amount of 0.50 parts by weight of the second part, 0.24 parts by weight of the second part, or 0.66 parts by weight of the second part.

22. The two-part composition of claim 8 wherein:

the urea peroxide catalyst is present in the amount of 0.28 parts by weight of the second part; and the ferrous ammonium sulfate activator is present in the amount of 0.05 parts by weight of the second part.

23. The two-part composition of claim 9 wherein:

the polymeric fluorochemical surfactant is present in the amount of 4.00 parts by weight of the first part, 1.9 parts by weight of the first part, or 2.59 parts by weight of the first part;

the aqueous dispersion of PTFE is present in the amount of 8.00 parts by weight of the second part, 24.3 parts by weight of the second part, or 7.06 parts by weight of the second part;

the ethoxylated (E015) trimethylolpropane triacrylate is present in the amount of 0.50 parts by weight of the second part, 0.14 parts by weight of the second part, 0.24 parts by weight of the second part, or 0.66 parts by weight of the second part;

the silane cross-linking solution is present in the amount of 1.00 parts by weight of the second part, 0.05 parts by weight of the second part, or 0.47 parts by weight of the second part;

the film-coating emulsion is present in the amount of 8.1 parts by weight of the first part;

the fluoroalkylfunctional water-borne oligosiloxane is present in the amount of 0.05 parts by weight of the second part or 0.14 parts by weight of the second part; and the waterborne anionically-stabilized colloidal dispersion of phenoxy resin is present in the amount of 0.05 parts by weight of the second part.

24. The two-part composition of claim 10 wherein the antimicrobial agent is present in the amount of 0.9 parts by weight of the first part, or 0.94 parts by weight of the first part.

\* \* \* \* \*

UNITED STATES PATENT AND TRADEMARK OFFICE
CERTIFICATE OF CORRECTION

| | |
|---|---|
| PATENT NO. | : 11,739,234 B2 |
| APPLICATION NO. | : 17/248664 |
| DATED | : August 29, 2023 |
| INVENTOR(S) | : Barry Culkin et al. |

It is certified that error appears in the above-identified patent and that said Letters Patent is hereby corrected as shown below:

In the Claims

In Claim 17, at Column 14, Line 45: please replace "The method of claim 16" with "The method of claim 11"

In Claim 18, at Column 14, Line 48: please replace "The method of claim 17" with "The method of claim 11"

In Claim 20, at Column 14, Line 60: please replace "The method of claim 19" with "The method of claim 11"

Signed and Sealed this
Seventeenth Day of October, 2023

Katherine Kelly Vidal
*Director of the United States Patent and Trademark Office*